United States Patent [19]
Pocol et al.

[11] Patent Number: 6,105,659
[45] Date of Patent: Aug. 22, 2000

[54] RECHARGEABLE THERMAL BATTERY FOR LATENT ENERGY STORAGE AND TRANSFER

[75] Inventors: Marius Pocol; Constantin Pandaru, both of Bucharest, Romania

[73] Assignee: Jaro Technologies, Inc., San Antonio, Tex.

[21] Appl. No.: 08/710,185

[22] Filed: Sep. 12, 1996

[51] Int. Cl.[7] .................................................. F28D 17/00
[52] U.S. Cl. ............................................ 165/10; 165/236
[58] Field of Search ........................... 165/10, 292, 236, 165/299

[56] References Cited

U.S. PATENT DOCUMENTS

| | | | |
|---|---|---|---|
| 2,401,797 | 6/1946 | Rasmussen | 210/150.5 |
| 3,083,543 | 4/1963 | Stanton | 62/3 |
| 3,088,289 | 5/1963 | Alex | 62/3 |
| 3,137,141 | 6/1964 | Kistler | 62/3 |
| 3,212,274 | 10/1965 | Eidus | 62/3 |
| 3,262,492 | 7/1966 | Meenan | 165/27 |
| 4,341,262 | 7/1982 | Alspaugh | 165/10 X |
| 4,381,818 | 5/1983 | Sachar et al. | 165/133 |
| 4,403,645 | 9/1983 | MacCracken | 165/10 |
| 4,439,337 | 3/1984 | Nimerick et al. | 252/70 |
| 4,719,968 | 1/1988 | Speros | 165/154 |
| 4,813,283 | 3/1989 | Craubner | 73/436 |
| 4,823,863 | 4/1989 | Nakajima et al. | 165/80.4 |
| 4,850,424 | 7/1989 | Mitani et al. | 165/10 |
| 4,977,953 | 12/1990 | Yamagishi et al. | 165/10 |
| 4,981,172 | 1/1991 | Haerle | 165/133 |
| 4,987,896 | 1/1991 | Nakamatsu | 128/399 |
| 4,996,847 | 3/1991 | Zickler | 62/3.64 |
| 5,061,630 | 10/1991 | Knopf et al. | 435/290 |
| 5,314,586 | 5/1994 | Chen | 202/177 |

Primary Examiner—Christopher Atkinson

[57] ABSTRACT

A device for the storage and transfer of thermal energy that includes a thermal reservoir maintained at or about its freezing or melting point temperature for storing a quantity of latent thermal energy, a thermal conductor between the thermal reservoir and an external substance, and a means for recharging the reservoir to maintain it at or about its freezing point.

1 Claim, 5 Drawing Sheets

RECHARGEABLE THERMAL BATTERY FOR LATENT ENERGY STORAGE AND TRANSFER

BACKGROUND OF THE INVENTION

1. Field of the Invention

The present invention relates generally to devices and methods for storing and transferring thermal energy for cooling and heating processes. The present invention relates more specifically to the structure and composition of a device for the storage and transfer of latent heat energy for the purposes of rapidly and controllably cooling or heating objects and environments.

2. Description of the Related Art

The transfer and storage of thermal energy has generally been accomplished through the use of mechanical compressors and the like that convert mechanical energy into thermal energy through the compression and expansion of appropriate compounds such as chloro-fluorocarbons. Problems with these compounds and their effect on the environment, however, have led those in the field to examine alternative compounds for use in mechanical compressor devices and to look to other means for the storage and transfer of thermal energy. While solid state thermal energy devices have been known for some time, their use has generally been limited because of their inability to either rapidly deliver the thermal energy required or to store that energy over time in a device that can, thereafter, rapidly deliver it in large quantities. One common solid state thermal energy device known as the Peltier element is capable of transferring thermal energy into or out of an object or environment that it is in contact with, but unfortunately these operate efficiently only at a relatively slow rate. Such Peltier element devices lend themselves to applications where either the gradual transfer of thermal energy is desired or a device is in place for the storage of thermal energy for later use.

There have been a number of attempts in the past to create materials, devices, and methods for the rapid cooling or heating of objects or environments. The following patents are representative of these efforts.

U.S. Pat. No. 4,823,863 issued to Nakajima et al. on Apr. 25, 1989, entitled THERMAL CONDUCTION DEVICE, describes the structure of an interface between a heat generating element, typically an electronic component, and a heat sink element. This interface includes a porous layer made of sintered metallic particles that form a rigid sponge-like structure within which a heat conductive oil is retained.

U.S. Pat. No. 5,061,630 issued to Knopf et al. on Oct. 29, 1991, entitled LABORATORY APPARATUS FOR OPTIONAL TEMPERATURE-CONTROLLED HEATING AND COOLING, describes the use of small particles of a heat conducting solid such as graphite or metal powder, or spheres of metal or glass, that serves both to conduct heat and to stabilize vessels that are placed within the particles. The device uses a Peltier element in contact with a metallic core that in turn is in contact with the small particles.

U.S. Pat. No. 2,401,797 issued to Rasmussen on Jun. 11, 1946, entitled HEAT EXCHANGER, describes another use of sintered metal as the medium for a heat exchanger. In Rasmussen, a number of copper tubes pass through the sintered, highly porous block of bronze. The sintering is carried out after the tubes are imbedded in the bronze powder so that bonding is accomplished between the sintered metal and the copper tubes.

U.S. Pat. No. 4,439,337 issued to Nimerick et al. on Mar. 27, 1984, entitled COMPOSITION AND METHOD FOR PREVENTING FREEZING TOGETHER OF VARIOUS SURFACES, describes a freeze "releasing" agent that contains at least three water soluble components, including: (1) a polyhydroxy compound or a monoalkyl ether thereof; (2) an organic non-volatile compound having at least one hydrophilic group, (2) being different than (1); (3) optionally a salt which functions to lower the freezing point of water; (4) an organic polymer which functions to increase viscosity; and (5) water as a carrying fluid.

U.S. Pat. No. 4,987,896 issued to Nakamatsu on Jan. 29, 1991, entitled APPARATUS FOR INCREASING THE ACTIVITY OF THE HUMAN BRAIN, refers to the use of liquids having low freezing temperatures, and gives as examples a 50% aqueous solution of ethylene glycol, propylene glycol, agar solution or the like.

U.S. Pat. No. 4,813,283 issued to Craubner on Mar. 21, 1989, entitled DENSITY MEASURING APPARATUS, describes the use of a liquid for improving the thermal coupling between a buoyant fluid and a temperature sensor. In the case of certain low temperature experiments, the coupling fluid is described as having a sufficiently low freezing point, and may comprise methanol, ethanol, toluene, isopentene and other suitable liquids.

U.S. Pat. No. 3,381,818 issued to Sachar et al. on May 3, 1983, entitled POROUS FILM HEAT TRANSFER, describes a composition intended for use as a heat sink film to be coated on the surface of an integrated electronic circuit. The film is composed of a porous metal, preferably aluminum.

U.S. Pat. No. 4,981,172 issued to Haerle on Jan. 1, 1991, entitled MECHANISM FOR HEAT TRANSFER, describes a heat transfer device that is coated at least in part with metal shavings, metal wires, or coarse metal powder made of thermally conducted material and then sintered. Haerle also describes initially distributing the metallic powder by shaking, by introduction over a sticky liquid, or by electrical and/or magnetic effects.

U.S. Pat. No. 4,996,847 issued to Zickler on Mar. 5, 1991, entitled THERMOELECTRIC BEVERAGE COOLER AND DISPENSER, describes a system that employs a Peltier element in the cooling of a liquid dispensed from a beverage bottle inserted into the top of the device. This device employs the Peltier element in conjunction with a honeycomb array of beverage passageways to quickly cool the liquid.

U.S. Pat. No. 4,719,968 issued to Speros on Jan. 19, 1988, entitled HEAT EXCHANGER, describes a heat exchange mass made up of particles of crystalline carbon, copper and aluminum. The Speros heat exchanger is described as taking a cylindrical or planar configuration and may be contained within metal conduits or, in the case of solar radiation, transparent or translucent enclosures.

U.S. Pat. No. 5,314,586 issued to Chen on May 24, 1994, entitled PURIFYING AND ENERGY-SAVING WATER FOUNTAIN CAPABLE OF SUPPLYING ICY, WARM AND HOT DISTILLED WATER, discloses an electronic chilling device that consists of radiating fins, a Peltier element and condensing fins. The patent also describes the use of a eutectic melting salt as a thermal medium within which a coil cooling pipe is positioned.

U.S. Pat. No. 3,088,289 issued to Alex on May 7, 1963, entitled WATER COOLER, describes a Peltier element positioned between an array of radiating fins or channels, and an interior cooling plate that surrounds the liquid being cooled. Insulation around the entire structure prevents heat loss after cooling.

The above patents describe systems that in general fail as solid state thermal energy mechanisms capable of large scale useful application. The use of solid state cooling and heating devices has generally been limited to very small applications where high rates of energy transfer are not required. Most attempts in the past to create thermal storage devices of significant size (from the standpoint of the quantity of heat energy they can retain) and with substantial transfer rates (from the standpoint of how fast they can absorb or deliver thermal energy), have been limited to mechanical devices such as compressors that are subject to all the disadvantages associated with any such non-solid state configurations.

SUMMARY OF THE INVENTION

It would be desirable, therefore, to have devices and methods for the rapid cooling or heating of objects or spatial environments that incorporate no moving mechanical parts and take up significantly less space than the well known compressor based thermal pump systems. It would be desirable if these devices and methods could operate at constant temperatures and could be made inexpensively of materials not toxic to the environment or to the user. It would be desirable if these devices could be of such a size as to be easily utilized in a large variety of thermal heating and cooling applications.

One primary element of the cooling devices and methods of the present invention is the preferred use of gels, solids, and aqueous solutions capable of being thermally charged so as to absorb and store large quantities of heat. Secondary features of the cooling devices and methods of the present invention include the structures and configurations appropriate for utilizing the thermal storage compounds in the process of rapidly cooling or heating solid objects or fluid or gas streams brought into contact with the devices.

The basic concept and one goal of the present invention is to provide a very large thermal reservoir in a very small spatial volume. This is accomplished by the use of specific gels, solids, and aqueous solutions described herein and by the use of thermal transfer structures that take advantage of the thermal characteristics of these gels, solids, and solutions. The benefits of maintaining a very small spatial volume in the devices of the present invention lie in the ability to easily insulate such volumes and prevent the loss of a thermal charge once it is in place.

Various applications of the present invention are anticipated, including the cooling of water and other fluids for drinking purposes as well as the cooling of fluids and gases for the purposes of refrigeration and air-conditioning. It is anticipated that this non-chloro-fluorocarbon based refrigerant system would have application in air conditioning units for vehicles and in larger enclosures. It is also anticipated that the structures described within the present invention could be implemented in portable rechargeable block configurations that may be inserted into containers of fluid or gas much along the lines of inserting large ice blocks or the like into such containers.

In general, the structures of the present invention are reversible both in physical orientation and in use. A fluid or gas may be passed through a device defined by the present invention or an inversely configured device could be immersed within the fluid or gas or placed in contact with a solid object. Likewise, the materials and compositions of the present invention lend themselves to utilization both as reservoirs for drawing large quantities of heat from a fluid, gas, or solid brought in contact with the device, or in delivering large quantities of heat to the fluid, gas, or solid, once such heat has been stored.

It is therefore an object of the present invention to provide a device for the storage of thermal energy.

It is a further object of the present invention to provide a thermal energy storage and transfer device capable of heating or cooling objects and environments and operable at a constant temperature or over a narrow temperature range.

It is a further object of the present invention to provide a thermal energy storage device capable of acting as a thermal sink for large quantities of heat present in the environment surrounding the device such that the device may serve to cool the environment.

It is a further object of the present invention to provide a thermal energy storage device capable of acting as a thermal reservoir for retaining large quantities of heat and controllably releasing such heat into the environment surrounding the device.

It is a further object of the present invention to provide a thermal storage device, and structures associated with the device, capable of drawing off large quantities of heat from a fluid or gas that is conducted through the device such that the fluid or gas is cooled once it is released from the device.

It is a further object of the present invention to provide a thermal storage device, and structures associated with the device, capable of releasing large quantities of heat into a fluid or gas that is conducted through the device such that the fluid or gas is heated once it is released from the device.

It is a further object of the present invention to provide a thermal storage device that is small in size and is thus easily insulated so as to maintain over time the thermal reservoir characteristics of the device.

It is a further object of the present invention to provide a thermal storage and transfer device that operates on a highly reversible process that enables the device to be repeatedly recharged without significant degradation.

It is a further object of the present invention to provide devices and methods that are usable in conjunction with a variety of thermal storage compounds that can be selectively chosen in accordance with the requirements of a particular application's temperature range and heat flow requirements.

It is a further object of the present invention to provide a thermal storage device that incorporates materials that are non-hazardous to the user and environment, specifically through the non-use of structures that increase the transfer surface area, including the use of chloro-fluorocarbons.

In fulfillment of these and other objectives, the present invention provides a thermal storage and delivery device and method that approaches the problem of transferring heat energy to and from objects and environments by selecting substances with known latent heat values most appropriate for the situation, and encasing these selected substances in structural enclosures optimized for the transfer of heat energy into or out of the object or environment to be cooled or heated. The structures of the present invention involve the use of membrane walls between the substances acting as thermal reservoirs and the object or environment to be cooled or heated. The transfer of heat energy through these membrane walls is facilitated by the use of structures that increase the transfer surface area, including the use of metallic powders that may adhere to or be attractively positioned on the membrane walls and yet still be immersed in the substance acting as the thermal reservoir. The selected substances used as the thermal reservoir are contained within enclosures that permit the use of Peltier electrical devices or other thermal transfer mechanisms for the recharge and/or maintenance of the thermal reservoir.

Finally, the structures of the present invention are designed to be sufficiently compact so that insulative envelopes, where they are required, are highly efficient because of their relatively low external surface area for heat transfer to occur.

Other objects of the present invention will become clear from a consideration of the detailed description that follows and the appended drawings and claims.

DETAILED DESCRIPTION OF THE PREFERRED EMBODIMENT

Figure 2:
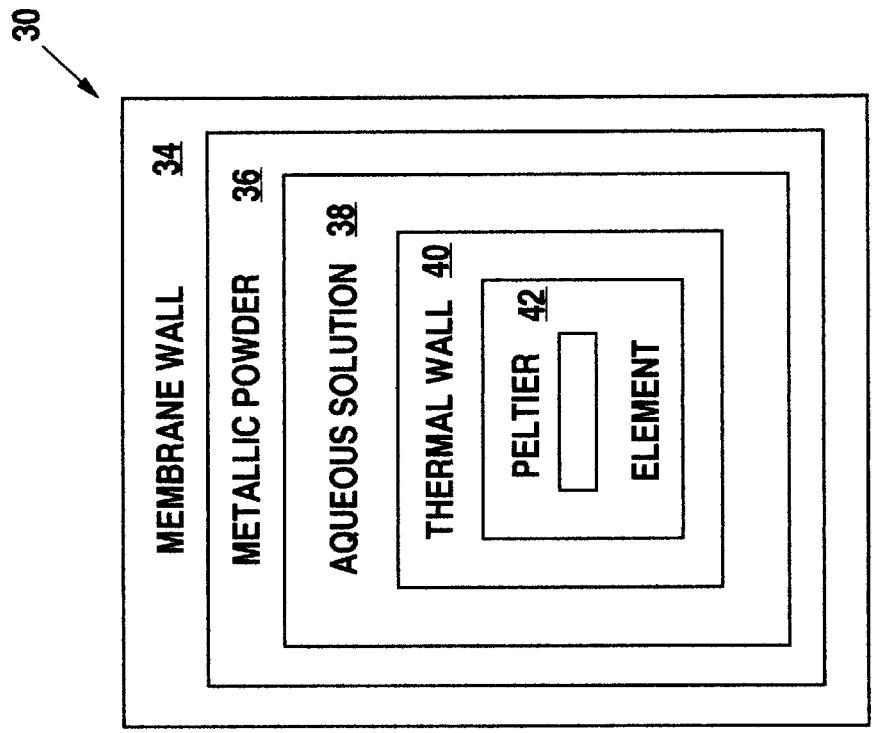
FIG. 2 is a schematic block diagram showing the primary structural elements of a device following the present invention as may be used for immersion into a liquid or gas environment that is to be heated or cooled or be brought into contact with a solid to be heated or cooled.
Figure 1:
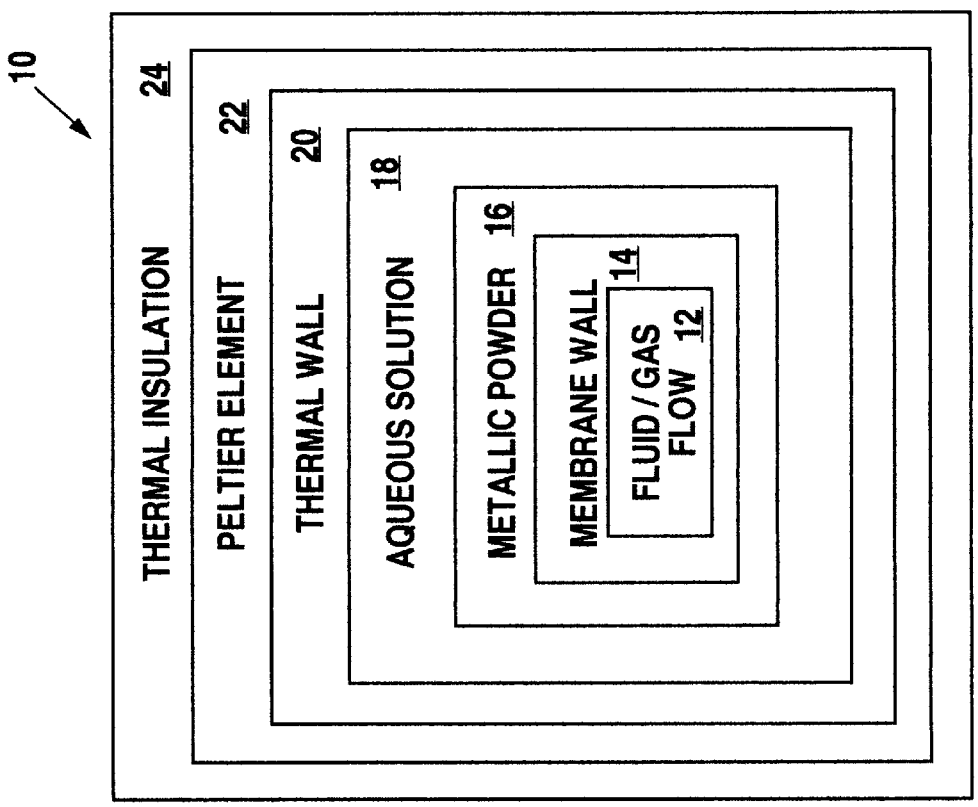
FIG. 1 is a schematic block diagram showing the primary structural elements of a device following the present invention as may be used to heat or cool a flow stream of a fluid or gas.

Reference is made first to FIGS. 1 and 2 for a detailed description of the primary elements of the present invention that form the basis of the structural configuration and the methods involved in effecting the present invention.

FIG. 1 is a schematic block diagram showing the elements of a device of the present invention appropriate for use in heating or cooling a fluid or gas flow as might be carried through a conduit or pipe. It is appropriate to make the analogy between the device of the present invention and an electrical battery insofar as the principles involved are analogous both in function and in the structures that these functions dictate. Whereas an electrical battery provides a reservoir for generating the flow of electrical current in a conductor, the thermal battery of the present invention provides a mechanism and a reservoir for causing a thermal flow within appropriate structural elements. Whereas an electrical battery typically includes compounds that carry out a chemical reaction that results in the establishment of an electrical potential difference, the present invention utilizes selected substances whose latent heat characteristics are appropriate for providing a given amount of heat flow over a specified period of time. As with electrical batteries, the conductors that are attached to the device at least partially determine the rate of the flow of energy from the device as well as the ability to recharge the device. Thus, the principles of the present invention involve not only the selection of appropriate substances whose freezing point/melting point temperatures and latent heat characteristics fit the requirements of the situation, but also the selection of structural heat conductive elements that facilitate the particular flow of heat required. Unlike the chemical reactions carried out in most electrical batteries, the processes carried out in the thermal batteries of the present invention are, for all practical purposes, completely reversible. Thus, depending on the application, the recharge cycle of the present invention is repeatable for an indefinite period of time.

In FIG. 1, thermal battery (10) is comprised of a sequence of enclosed elements that concentrically surround the flow of the fluid or gas that is to be cooled or heated. Fluid/gas flow (12) would, in the typical situation, occur through a conduit pipe, tube, or the like. Membrane wall (14) is provided to surround the fluid/gas flow either directly in the form of a pipe or conduit, or indirectly by thermal contact with the pipe or conduit. In the preferred embodiment, membrane wall (14) is in direct contact with fluid/gas flow (12).

Energy transfer in the device of the present invention is carried out through solid walls positioned between the thermal reservoir and the substance or environment to be heated or cooled. These solid walls will comprise one or a combination of three basic wall structures. These three basic structures include cellular walls, walls with increased surface areas for a given volume, and magnetic walls. Cellular wall structures are described in more detail below with respect to FIG. 6 and generally contain substances or materials that include graphite powders, metallic powders (such as silver, copper, aluminum, or their alloys), or combinations of graphite and metallic powders or substances containing them. Walls with increased surface area incorporate various geometries such as wings, corrugations, teeth, indents, helicoils, and so on that may be chosen according to the requirements of the specific application. Magnetic walls contain at least two layers, one of which may be magnetic and to which are attached magnetic powders and/or the powders described above. In any event, energy transfer is accomplished through these solid walls between the thermal storage material and the outside object or environment. A rapid transfer of energy is accomplished by the increased surface area created by the above-described mechanisms.

In many applications of the present invention, it is preferable to incorporate metallic powder (16) in conjunction with membrane wall (14) so as to facilitate the heat transfer between membrane wall (14) and aqueous solution (18). Metallic powder (16) serves to increase the surface area through which heat may flow between aqueous solution (18) and membrane wall (14). Other mechanisms for increasing the interface surface area may also be employed. Various structural folds in the membrane wall itself may provide a sufficient heat transfer conduit in some situations, eliminating the need for the particles shown in FIG. 1.

In certain applications, it is anticipated that metallic powder (16), in addition to having optimal thermal characteristics, would be ferromagnetic in nature so as to readily deposit itself on a ferromagnetic metal based membrane wall (14). It is not necessary that metallic powder (16) be rigidly attached, as through a sintering process or the like, to membrane wall (14). This is especially true if metallic powder (16) is made to be magnetic in character and is simply permitted to attach itself to the surface of membrane wall (14) in a distribution appropriate for the flow of aqueous solution (18) therethrough.

Aqueous solution (18), the selection of which is described in more detail below, is chosen so as to have characteristics appropriate for the temperature, the thermal storage, and the thermal flow requirements of a particular application. In general, the present invention is utilized where large quantities of heat flow are required over short periods of time at relatively constant temperatures, utilizing small volumes of a thermal reservoir. Thus, aqueous solution (18) is in the preferred embodiment typically an organic or inorganic solution, such as those substances identified in the tables below, that is capable of storing large quantities of heat energy within the crystalline and molecular structures of the substance over a constant or relatively narrow temperature range associated with the melting point (freezing point) of the substance.

As is well known in the art, latent heat energy is that amount of energy that may flow in or out of a substance as the temperature of the substance passes through the melting (freezing) point of the substance. As this latent heat flow occurs, the temperature of the substance remains relatively constant at the melting (freezing) point. Normally, as heat energy flows in or out of a substance it effects a temperature change in the substance. At the particular melting or freezing point of the substance, a flow of heat energy in or out of the substance instead carries out a phase change rather than a temperature change. Different substances have greater or lesser latent heat energy values that reflect the amount of heat that may flow in or out of a substance before temperature changes in the substance are once again exhibited. Aqueous solution (18) is therefore selected according to the freezing temperature and the latent heat energy values required for a particular substance and the appropriateness of these parameters for the requirements of the application involved.

Surrounding aqueous solution (18) is thermal wall (20) which functions as conduit for the recharge of aqueous solution (18) and not for the conduction of heat in or out of the object to be cooled or heated. In a preferred embodiment, thermal wall (20) is a conduit between aqueous solution (18) and Peltier element (22). Peltier element (22) provides a non-mechanical, solid state mechanism for recharging aqueous solution (18) by either directing heat energy into the solution to store for later use or extracting heat energy from the solution to provide a thermal sink for the cooling of an object or environment. Peltier element (22) is, in conjunction with the rest of thermal battery (10), surrounded by thermal insulation (24) to reduce the environmental effects of heat flow in or out of the overall system.

Although most of the examples presented herein of the implementation of the present invention use a Peltier element as the mechanism for recharging the thermal reservoir, it is anticipated that any of a number of different mechanisms for thermally recharging the reservoir could be utilized. As one object of the present invention is to provide a solid state device that is not subject to the maintenance requirements often found in conjunction with compressor based units, it is anticipated that a number of other non-compressor based systems could be utilized in place of the Peltier element. For example, use of the present invention in some environments that operate at high altitude or under water where external conditions provide adequate thermal cooling capabilities, external air or water might be conducted to the thermal battery structure of the present invention for the purpose of gradually recharging the battery during and after use. Likewise, it is anticipated that in some situations conventional cooling and heating units could be utilized to recharge the thermal batteries of the present invention at a rate that allows for the most efficient operation of the conventional units. One example of this latter case is described in more detail with respect to FIG. 8. In this respect, it is anticipated that the present invention could be utilized as both the primary component in a new installation for a heating or cooling system, or as a retrofit element to upgrade or improve the efficiency of an existing heating or cooling system.

FIG. 2 describes a device structure that is essentially the inverse of that shown in FIG. 1. Whereas the device in FIG. 1 would be utilized in association with the cooling or heating of fluid or gas in a stream through the device, FIG. 2 describes the construction of a device appropriate for use where the device is to be immersed in or otherwise brought into contact with the object or environment to be heated or cooled. In this case, thermal battery (30) is comprised of membrane wall (34) surrounding the device and serving as the primary conduit of heat flow in or out of the device. Metallic powder (36) is, as described above, distributed on membrane wall (34) in order to facilitate the flow of heat between aqueous solution (38) and membrane wall (34).

Thermal wall (40) provides the conduit between aqueous solution (38) and Peltier element (42) which again serves to recharge the device by either extracting heat from aqueous solution (38) or directing heat back into aqueous solution (38).

It is anticipated that the device structure shown in FIG. 1 would function in a manner similar to standard refrigeration or heating systems where a fluid or gas is conducted through the device and heated or cooled for subsequent use after passing out of the device. FIG. 2, on the other hand, would function more in the nature of a "block of ice" or a "hot rock" that is immersed in the fluid or gas to be heated or cooled or is brought into thermal contact with the solid to be heated or cooled. In either case, the principles of heat flow are the same, it is simply the orientation of structural elements that changes in order to direct that heat flow into or out of the substance of concern.

Figure 3:
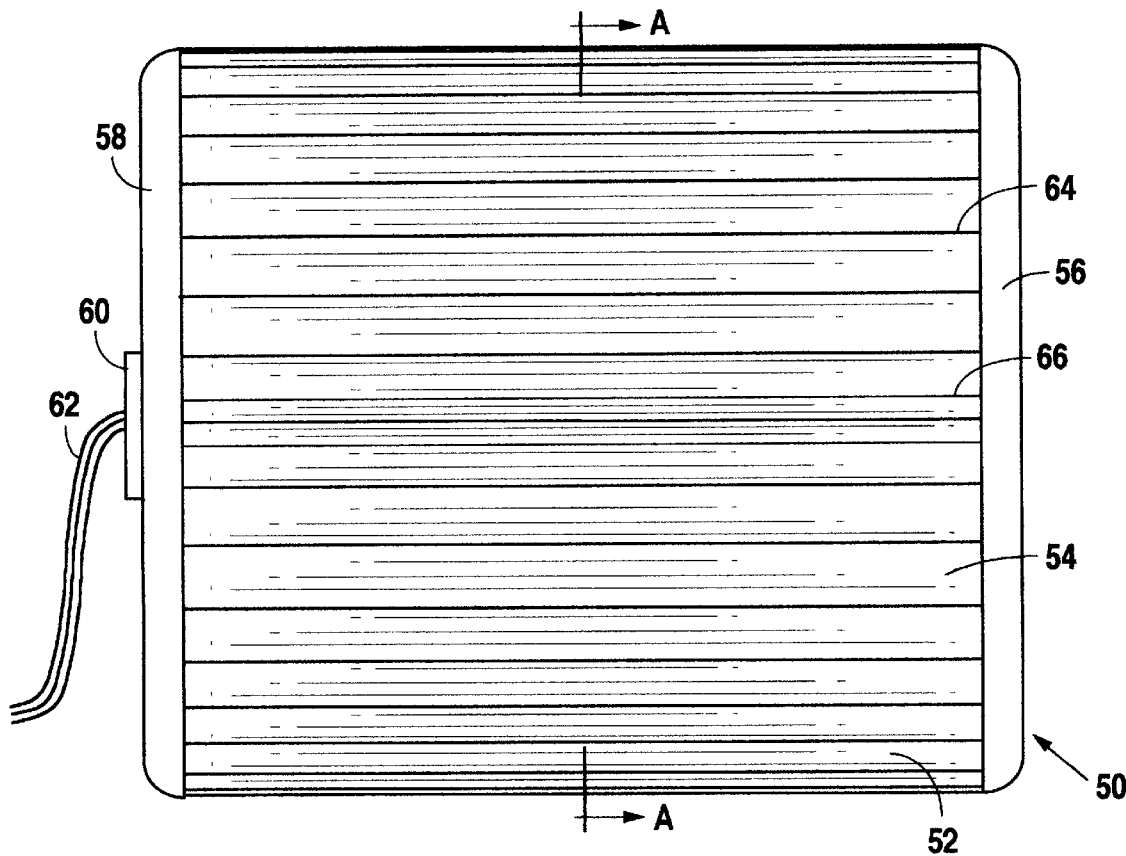
FIG. 3 is a side view of the structure of a first preferred embodiment of a thermal storage device of the present invention.
Figure 4:
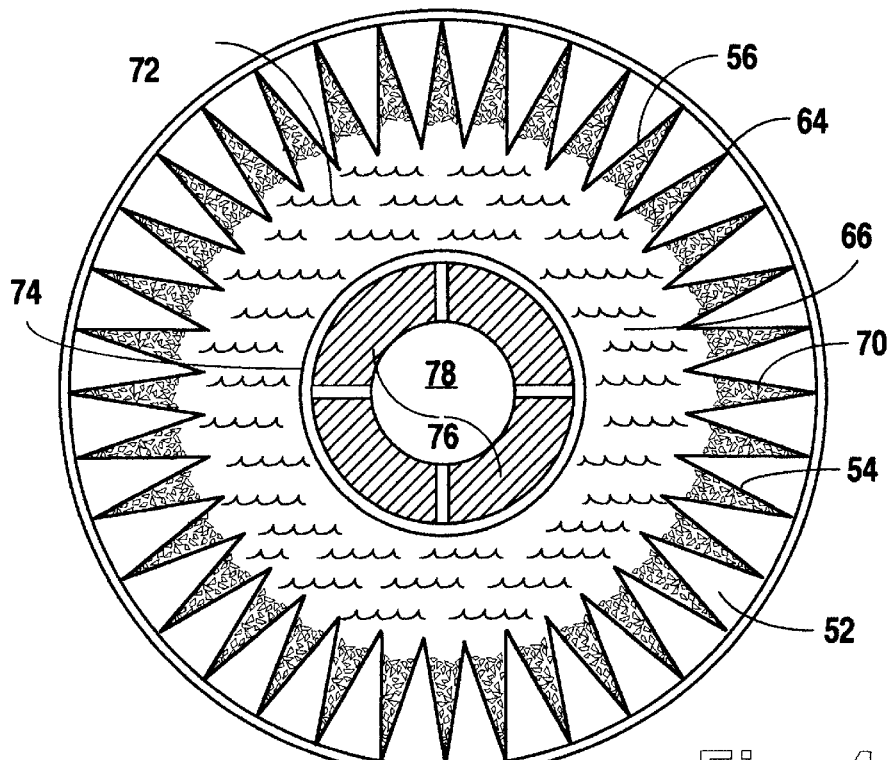
FIG. 4 is a cross-sectional view of the device shown in FIG. 3 taken along section line A.

Reference is now made to FIGS. 3 and 4 for an example of a first preferred embodiment of the present invention showing application of the structures generally referred to in FIG. 2. Thermal battery (50) disclosed in FIG. 3 is a cylindrical structure comprised primarily of metallic components that encase a selected substance used as a thermal reservoir. Thermal battery (50) is made up of a cylindrical shell (52) which is itself made up of an array of radiating walls (54). Cylindrical shell (52) is capped on either end by end cap (56) and end cap (58). Radiating walls (54) meet at exterior edges (64) and again at interior edges (66). The structure of these radiating walls (54) is better disclosed and described in the cross-section view shown in FIG. 4.

The structure of thermal battery (50) disclosed in FIG. 3 is such as would be appropriate for immersion of the device into a liquid or gas that is to be cooled or heated. Radiating walls (54) are designed to facilitate the transfer of heat to the substance to be cooled or heated and serve as the membrane walls described with reference to FIG. 2. The walls (54) are preferably constructed of materials that are both thermally conductive and structurally strong. Metals such as aluminum or copper provide both conductivity and strength under most conditions. In many instances, it is desirable that walls (54) be configured to adapt to changes in ambient pressure. This adaptability could be provided by selection of flexible materials or by the design of flexible enclosures as would allow for the expansion and contraction of the compound acting as the thermal reservoir. The flow of a fluid or gas to be heated around thermal battery (50) could be forced by external flow mechanisms or could simply be the natural flow resulting from the temperature differentials developed as a result of the fluid or gas contact with thermal battery (50). Recharge of thermal battery (50) is accomplished through electrical connection (62) that connects to the Peltier elements (not shown in FIG. 3) interior to thermal battery (50). Electrical conductors (62) are sealed against the external fluid or gas by way of end cap seal (60).

FIG. 4 shows, in cross-sectional detail taken along line A in FIG. 3, the interior of thermal battery (50). Radiating walls (54) are shown as they meet at external edges (64) and internal edges (66) and as they are positioned with respect to the perimeter of end cap (56). Positioned and distributed within the interior angles of radiating walls (54) is metallic powder (70). Allowed to distribute itself on these walls as by the magnetic means described above, metallic powder (70) is permeated by aqueous solution (72) and in conjunction with radiating walls (54) provides an increased surface area of contact between aqueous solution (72) and the environment external to the device. Aqueous solution (72) is maintained and enclosed on the interior of thermal battery (50) both by end caps (56) and (58) and radiating walls (54).

Aqueous solution (72) surrounds thermal wall (74) which serves to conduct heat from aqueous solution (72) in and/or out of Peltier elements (76). Peltier elements (76) are positioned around a central core (78) that may either be closed or open in the preferred embodiment depending upon the specific requirements of the structure of Peltier elements (76).

Figure 5:
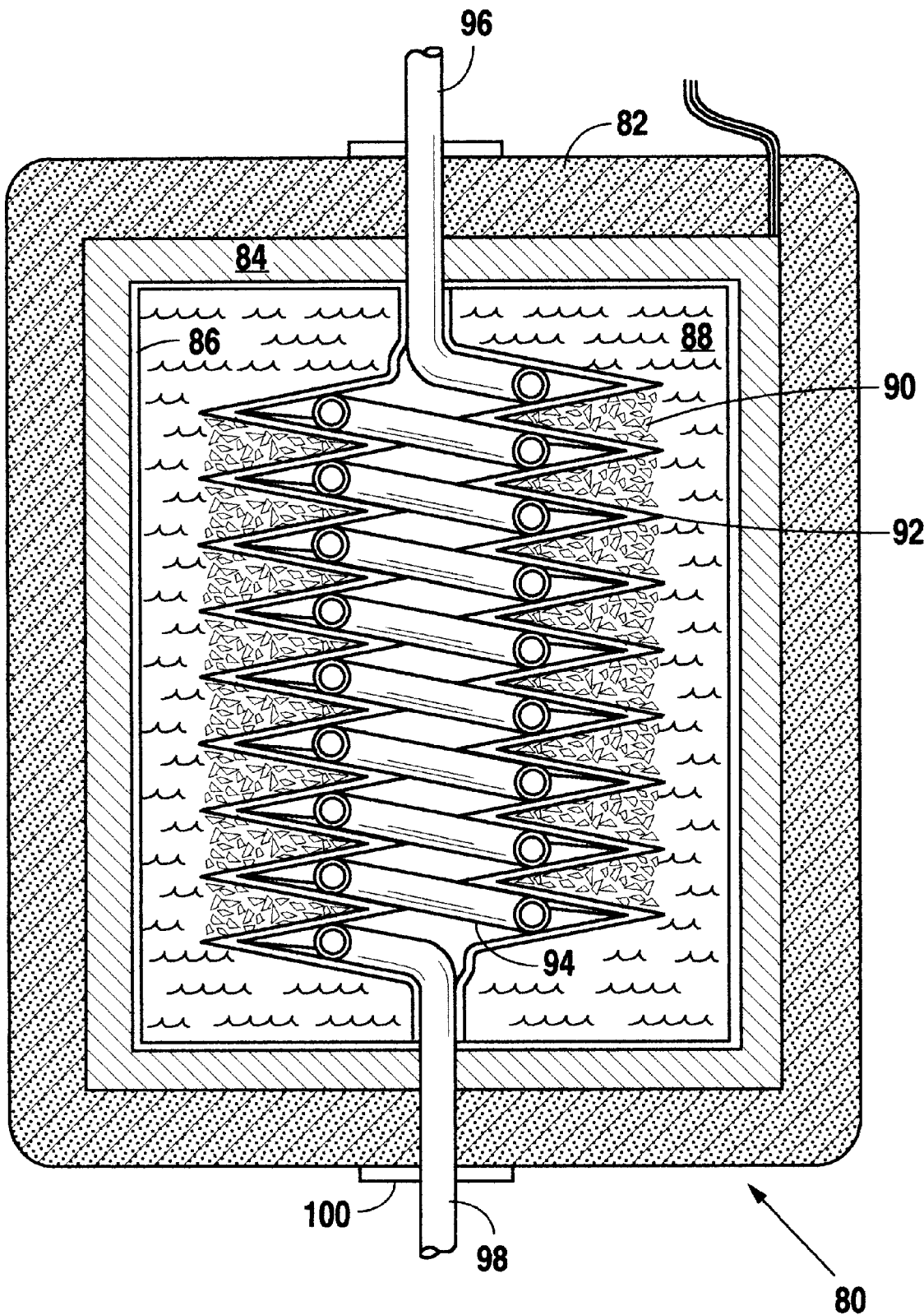
FIG. 5 is a cross-sectional view of a second preferred embodiment of the present invention implementing the generic structure described in FIG. 1.

Reference is now made to FIG. 5 for a detailed description of an implementation of the device of the present invention in the manner shown in FIG. 1. FIG. 5 shows an appropriate structure for utilizing the device of the present invention to heat or cool a fluid or gas stream as it passes through the device. With the objectives of the present invention in mind, especially those of small size and large thermal storage capabilities, thermal battery (80) is structured to conduct a fluid or gas through the device for the purposes of heating or cooling it. Thermal battery (80) is comprised of external insulating shell (82) that surrounds Peltier elements (84). Appropriate electrical connectors for the function of Peltier elements (84) pass through insulative shell (82).

Aqueous solution (88) is contained within thermal wall (86) that is in thermal contact with Peltier element (84) and serves as a mechanism for transferring heat in and out of aqueous solution (88) so as to maintain and/or recharge thermal battery (80). Aqueous solution (88) surrounds a coiled structure configured to permit an efficient flow of heat in or out of the fluid or gas to be heated or cooled. Membrane wall structures (92) are positioned within aqueous solution (88) and have distributed over their surface metallic particles (90) in a manner that increases the surface area of contact between aqueous solution (88) and membrane wall (92). Interior to membrane wall (92) is conduit (94) which carries the fluid or gas to be heated or cooled. Inlet (96) and outlet (98) are the connection points for introducing and extracting the liquid or gas flow through thermal battery (80). Cap seals (100) complete the insulative characteristics of insulative shell (82) for thermal battery (80).

It is anticipated that wall structure (92) shown in FIG. 5 is but one of a large number of differing examples of wall structures generally referenced by the "membrane wall" described above in FIG. 1. Again, this membrane wall structure could be the conduit itself that encloses the flow of fluid or gas through the system. Certain circumstances, however, may dictate one or more structural layers of a "membrane wall" be in place so as to permit the easy physical transport of the fluid or gas through the system. The structure of wall (92) shown in FIG. 5 is therefore provided as illustrative only and as could vary significantly in appearance depending upon the specific application.

It is anticipated, for example, that the flow of fluid or gas through the system of the present could be carried out through a straight conduit with no bends or coil-like configurations as are shown in FIG. 5. While this would facilitate the flow of the substance through the device, it would reduce the amount of time that the fluid or gas spends in contact with the thermal reservoir of the device. In many instances, the amount of time that the fluid or gas is in contact with the thermal reservoir is less critical than the need for rapid flow through the device. In such a case, modifications of the structure shown in FIG. 5 would be appropriate.

Figure 6:
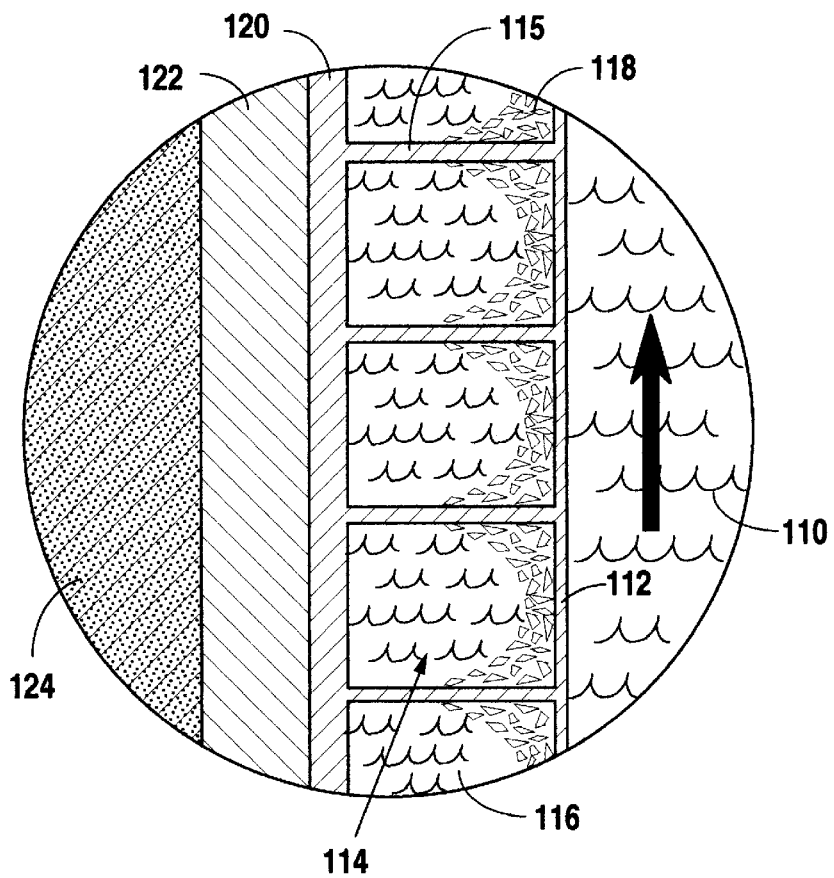
FIG. 6 is a detailed cross-sectional view of a container wall structure implementing the principles of the present invention.

Reference is now made to FIG. 6 for a description of a third preferred embodiment of the present invention that has general applicability to both the structure shown in FIG. 1 and that shown in FIG. 2. FIG. 6 discloses in cross-section the structure of a thermal reservoir wall such as might be used for either a container within which a solid, liquid, or gas is enclosed, or a block that may be immersed in a fluid or gas or brought into contact with a solid.

The wall structure shown in FIG. 6 is positioned adjacent to flow (110) of a fluid or gas to be heated or cooled. Membrane wall (112) serves as the interface for the flow of heat in or out of flow (110). The wall structure of FIG. 6 is made up of individual cells (114) that are bounded by membrane wall (112) on one side and a plurality of cellular walls (115) on the inside. Cellular walls (115) connect to thermal wall (120). Each cell (114) contains aqueous solution (116) and metallic particles (118). Metallic particles (118) are either magnetized or are ferromagnetic so as to be attracted to and distribute themselves along membrane wall (112). Aqueous solution (116) contained within each cell (114) may be recharged through structural wall (120) by way of Peltier element (122). Peltier element (122) is insulated from the external environment by way of insulating layer (124).

As indicated above, the wall structure shown in FIG. 6 could be utilized as the shell wall of a container that encloses a solid, liquid, or gas (110). In this case, cells (114) would be directed to the interior of the container whereas Peltier element (122) and insulative layer (124) would be on the exterior of the container. On the other hand, the wall structure shown in FIG. 6 could be utilized in the form of a solid block or plate with cells (114) positioned on the exterior surface of the device and Peltier element (122) positioned within the center of the device not unlike the structure shown in FIGS. 3 and 4.

Every embodiment of the present invention incorporates the use of an aqueous solution or a gel/solid substance whose latent heat and freezing point temperature characteristics are appropriate to provide the thermal reservoir necessary in any given situation. Most frequently, the substances involved would include a selection of the following:

(a) Aqueous inorganic solutions with freezing points between −60° C. and −10° C. These would include inorganic salt solutions such as aqueous solutions of potassium iodide, sodium iodide, and potassium carbonate.

(b) Aqueous organic solutions with freezing points between −60° C. and −100° C. These could include aqueous solutions of the primary alcohols, secondary alcohols, tertiary alcohols, phenols, aldehydes, ketones, acids, esters, ethers, any combination of the previous aqueous solutions, and any other substances which contain as their base elements these solutions or combinations of them.

(c) Aqueous solutions of simple and polynuclear complex combinations.

(d) Any other combination of the substances described above in (a), (b), and (c), or any substances based on these substances and any combination of them.

The following tables provide examples of various substances appropriate for selection as the thermal reservoir medium utilized in the present invention. Table 1 provides a number of aqueous salt solutions whose freezing points are below the ordinary freezing point of water such that their use would be appropriate in situations where the cooling of objects or environments near or below the freezing point of water is necessary. Some examples of the latent heat energy for a select few of these substances are also shown in Table 1.

Table 2 provides crystallizing temperatures for various aqueous alcohol and aqueous glycerin solutions at a variety of concentrations. Here again, the freezing point temperatures provide an array of parameters appropriate for selecting a particular solution when a specific temperature range is desired.

Table 3 provides examples of substances that could serve as thermal reservoirs for implementation of the present invention in a heating process rather than a cooling process. These substances exhibit melting points at temperatures above the boiling point of water and thus could serve to increase the temperature of fluids or gases where such high temperatures are desired. Here again, representative values of the latent heat energies for some of these substances are provided.

Some of the substances identified in Table 3 do not necessarily fit the objective of the present invention for non-hazardous materials but are included in the table as examples of substances with extreme or importantly different latent heat values. In some cases where such large latent heat values might be desirable, efforts could be made to minimize the hazardous characteristics of the substances and still utilize the substances according to the principles of the present invention.

The examples in the tables shown are not intended to be limiting of the substances appropriate for use in conjunction with the structures and methods of the present invention. In addition to the examples shown in the tables which are primarily made up of aqueous solutions and certain solids with appropriate melting points, various gel compositions have been found to be useful as thermal reservoir compounds. On the other hand, these examples do provide representations with regard to the capabilities of the system described by the present invention.

TABLE 1

| SUBSTANCE | CONCENTRATION | TEMPERATURE °C. | LATENT HEAT KJ/Kg |
|---|---|---|---|
| $NH_4Cl$ | 22.7 g + 100 g water | −15.8 | 310 |
| $CaNO_3\ 4H_2O$ | 100 g + 100 g water | −16 | |
| $NH_4NO_3$ | 45 g + 100 g water | −16.7 | 286 |
| NaCl | 30.7 + 100 g water | −21.2 | 236 |
| $MgCl_2\ H_2O$ | 84 g + 100 g water | −34.6 | |
| $CaCl_2\ 6H_2O$ | 143 g + 100 g water | −55 | 213 |

TABLE 2

CRYSTALLIZING TEMPERATURES FOR AQUEOUS ETILIC ALCOHOL AND GLYCERINE AQUEOUS SOLUTIONS

| % WEIGHT | 5 | 10 | 20 | 40 |
|---|---|---|---|---|
| ALCOHOL (° C.) | −1.95 | −4.20 | −10.7 | −30.8 |
| GLYCERINE (° C.) | −0.45 | −1 | −2.5 | −17.2 |

TABLE 3

| SUBSTANCE | TEMPERATURE °C. | LATENT HEAT Kcal/Kg |
|---|---|---|
| PLUTONIUM | 640 | 3773 |
| ZINC | 419.5 | 26 |
| TIN | 231.9 | 14.2 |
| SELENIUM | 217.4 | 16.4 |
| MAGNESIUM | 649.5 | 88 |
| PARAFFIN | 42–75 | 35 |
| CALCIUM | 850 | 78.5 |
| ALUMINUM | 659.7 | 85 |
| NAPTHALINE | 80.1 | 36.62 |
| $AlCl_3$ | 190 | |
| $FeCl_2$ | 302 | |
| $CuCl_2$ | 430 | |
| $ZnCl_2$ | 315 | |
| $PbCl_2$ | 500 | |
| $NaCl_2$ | 802 | 124 |
| $NA_2CO_3$ | 850 | |
| $NA_2SO_4$ | 88 | 62 |

A typical example of an application of one of the solutions from the tables above and the structures of the present invention would be for the purpose of cooling a beverage for human consumption. A structure such as that disclosed in FIG. 5 could incorporate, for example, an aqueous solution of calcium chloride ($CaCl_2.6H_2O$) such as disclosed in Table 1. With a freezing point of −55° C. and a latent heat of 213 KJ/Kg, an aqueous solution of calcium chloride could be cooled to its freezing point and utilized as a thermal reservoir to draw heat from a beverage that is passed quickly through a conduit within the aqueous solution. The significant latent heat value of the calcium chloride solution would provide more than enough cooling effect on the beverage to permit a continuous use of the coolant battery at a constant temperature for a reasonable period of time without the necessity of recharging the reservoir. After the latent heat energy had been used up (and even beyond that for a period of time while further heat flow into the solution provided for a temperature rise) process controls would implement a gradual cooling or recharge of the aqueous solution through the Peltier elements in place. Alternately, such thermoelectric recharge devices could act continuously to maintain the charge on the thermal reservoir during the discharge process.

A similar implementation of the structure shown in FIG. 5 could be utilized in, for example, an automotive air conditioning system. The thermal battery could be used to either directly or indirectly cool the air that flows into the vehicle during operation of the air conditioning system. Recharge and/or maintenance of the battery through the Peltier element would occur from the electrical system of the vehicle and could operate over a longer period of time since it is not directly associated with the flow of heat in and out of the air conditioning system. Indeed, the objective of the present invention is to provide a mechanism whereby a large thermal reservoir can provide a rapid flow of thermal energy and can then be gradually recharged over time where the recharge rate is not so important.

Figure 7:
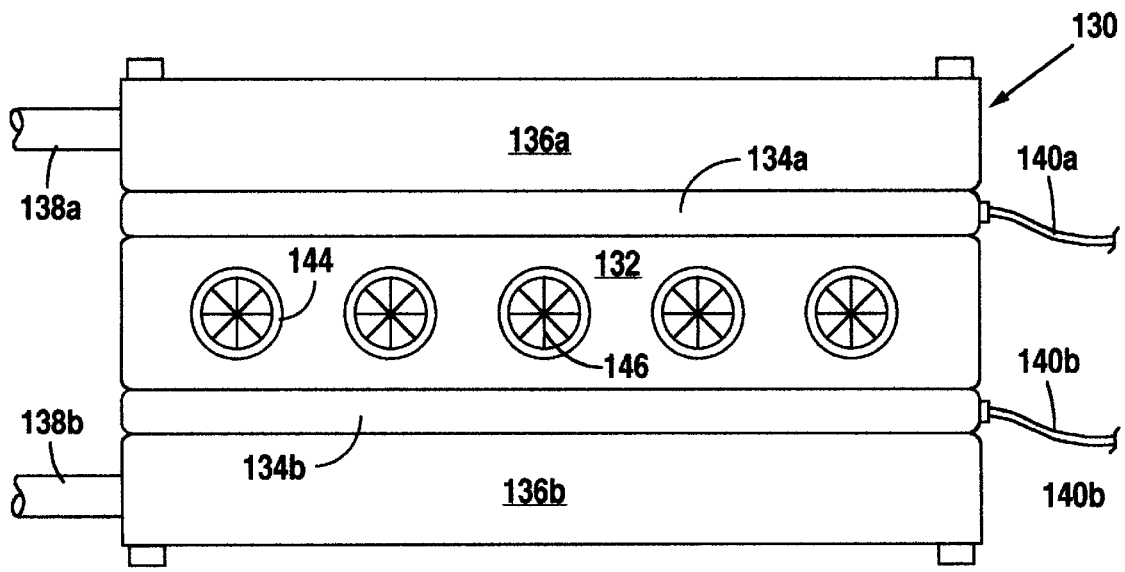
FIG. 7 is a schematic side view of one implementation of the present invention for use in conjunction with an automotive air conditioning system.

Reference is now made to FIG. 7 for a more specific structural example of one implementation of the elements of the present invention. FIG. 7 discloses a simple automotive air conditioning unit (130) suitable for operation and installation in most small automobiles and trucks. Air conditioning unit (130) is comprised of sandwiched layers of the elements of the present invention. These layers include thermal reservoir (132), Peltier elements (134a) and (134b) and heat dissipation plates (136a) and (136b). The function of the present invention is carried out through thermal reservoir (132), which in the embodiment shown in FIG. 7 preferably uses a gel compound as the material for the thermal reservoir. In thermal contact with thermal reservoir (132), Peltier elements (134a) and (134b) serve to recharge and/or maintain thermal reservoir (132), the elements being electrically driven off of the vehicle's battery by way of electrical connectors (140a) and (140b). The drain on the vehicle's electrical battery for the constant recharge of the thermal battery through Peltier element (134a) and (134b) is sufficiently small as to be more than compensated by the vehicle's own electrical recharging system when in operation.

In this particular application, the use of heat removing plates (136a) and (136b) is facilitated by the use of a water-based cooling system or other means for dissipating heat.

Through conduits (138a) and (138b), a coolant flow of water from the vehicle's cooling system can be utilized to assist in the removal and dissipation of heat brought about by Peltier elements (134a) and (134b) during the recharge of thermal reservoir (132).

The entire air conditioning block (130) is held together in the sandwich configuration shown with bolts (142). A flow of air is directed through thermal reservoir (132) by way of thin wall conduits (144). Within each thin wall conduit (144) a turbulence creating vane structure (146) is in place to facilitate the exchange of thermal energy between the air flowing through thin wall conduit (144) and thermal reservoir (132). Well known means for ducting this cooled air into the vehicle's interior are thereafter utilized. Positioning of the thermal block (130) within the vehicle will depend primarily on the appropriate location of the air ducts in the vehicle's interior.

Figure 8:
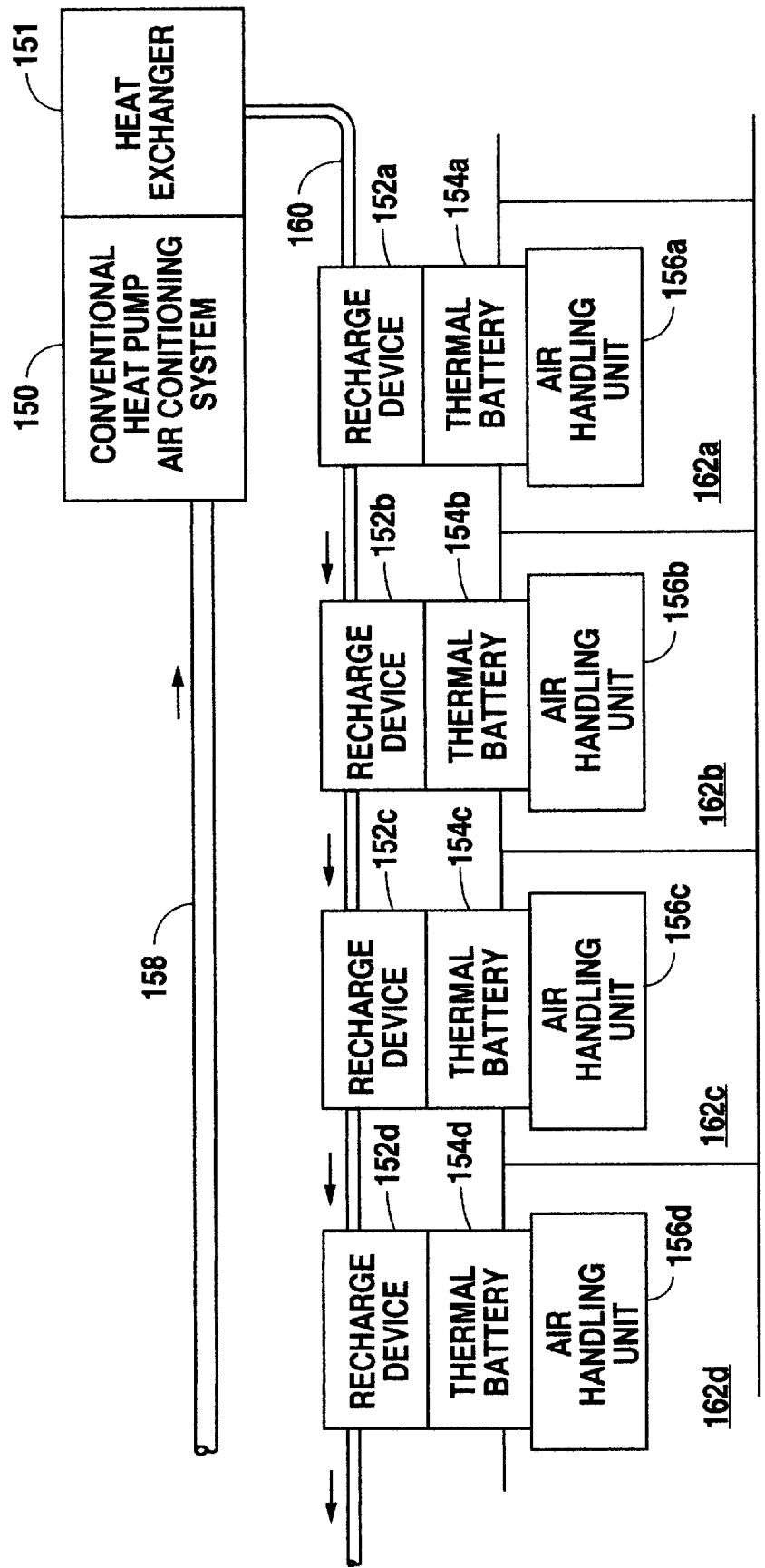
FIG. 8 is a schematic block diagram showing implementation of the present invention in conjunction with a conventional air conditioning system where multiple air handling units are in place.

Reference is now made to FIG. 8 for yet another example of the use of the present invention, this time in tandem with, instead of replacing, a conventional heat pump/air conditioning system. Conventional heat pump air conditioning system (150), such as might be found in a hotel environment for the purpose of air conditioning a large number of hotel rooms, is connected in standard fashion to individual units associated with each of the rooms. In this case, however, thermal batteries (154a) through (154d) are positioned in association with each of the individual units for each of the rooms (162a) through (162d). Air handling units (156a) through (156d) for each of the rooms are positioned as shown and utilize thermal batteries (154a) through (154d) for the purpose of providing individually controlled cooling capabilities. Thermal batteries (154a) through (154d) are recharged by way of recharge devices (152a) through (152d) which operate in conjunction with the conventional cooling system (150) ducted to each device by way of conduit (160).

Conventional system (150) incorporates a heat exchanger (151) that cools a circulating stream of non-volatile, non-pressurized fluid. This circulating fluid may be one or a combination of any of the solutions described above with regard to the thermal reservoir of the present invention. This fluid flows in conduit (160) to each of recharge devices (152a) through (152d) and thereby recharges the thermal storage components of thermal batteries (154a) through (154d). In this manner, the high pressure freon lines normally associated with conventional air conditioning and heat pump systems are restricted to a single location apart from each of the individual room units. A controllable, efficient flow of this liquid in conduits (160) and in return conduit (158) could maintain each of the recharge device (152a) through (152d) in a state sufficient for the continuous maintenance of each of thermal batteries (154a) through (154d), regardless of the demands placed on any individual thermal battery.

The benefits of utilizing individual thermal batteries (154a) through (154d) is that they provide large thermal reservoirs for very quick transfer of thermal energy to (from) individual spatial enclosures. This allows the conventional heat pump system (150) to operate at a more efficient level since its job is primarily to maintain the charge on the thermal batteries and not to react to frequent changes in individual room demands on the cooling system. It is anticipated that the specific structures described in FIG. 8 are generically applicable in any of a number of situations where a conventional heating or cooling system's operation could be made more efficient through the use of a plurality of individual thermal battery based heating or cooling units.

Individual rooms in the example described above could derive different room temperatures from thermal batteries maintained at a singular temperature (as is characteristic of the present invention) through the use of various mixes of air flow across or through the thermal batteries. In many applications, however, it is quite desirable that the heat flow created by the thermal battery occurs at a constant temperature. In fact, the present invention could be utilized in situations where maintenance of a constant temperature is the primary goal of the system. Examples include gyroscopic devices that do not involve large quantities of heat flow but do require the maintenance of constant temperatures.

As indicated above, it is anticipated that many variations of the structures described herein could be implemented for various specific applications of the principles of the present invention. It is anticipated that both small and large scale applications of the principles could be implemented with appropriate modifications of the structures described. From packages as small as might be suitable for electronic microchip cooling to packages that would be large enough to handle the cooling requirements of air conditioning systems for large buildings, the principles of the present invention would be effective in providing an efficient and low maintenance mechanism for the transfer of heat in and out of these objects and environments.

It is further anticipated that the thermal batteries of the present invention could be configured in standardized packages suitable for "off-the-shelf" utilization. These packages would be standardized by geometric structure, energy capacity, and operating temperature. The geometric structure would be standardized for the purpose of incorporating the thermal batteries of the present invention into a large variety of applications without significant modification of the battery's geometry. Standardized operating temperature values would be selected for various groups of specific applications that might, for example, require temperatures that are at or near the freezing point of water, at or near comfortable room temperatures for air conditioning purposes, at or near the boiling point of water for specific heating purposes, and so on. Broad categories of temperature ranges are thus identifiable and capable of being standardized into such thermal battery packages. Finally, the energy capacity of the individual thermal batteries cold be standardized such that the user could purchase and obtain a package with a known quantity of energy deliverable over a specific period of time. The analogy to electrical batteries is again applicable here where standardization is desired. The temperature rating of a thermal battery would be the equivalent of an electrical battery's voltage, whereas the energy capacity might be the equivalent of the electrical energy capacity of a battery or, indirectly, the equivalent of the current deliverable from a battery. The standardized structures could be analogous to the various standardized electrical cells that are currently on the market. Both the structures and compositions of the present invention lend themselves to such standardized packaging.

In summary, the present invention describes a solid state device capable of storing a high quantity of energy in a very small volume. The device utilizes a reversible process to very quickly deliver this large quantity of energy. The devices incorporate non-toxic substances operable at ambient pressures and thus eliminate many of the hazards and other problems associated with electrical energy storage devices.

We claim the principle, the walls, the storage means, the devices and the rechargeable devices as follows:

1. A cooling device for withdrawing heat energy from a flow of gas, said cooling device comprising:

a thermal reservoir, said thermal reservoir comprising a quantity of a compound at or about a temperature approximately equal to said compound's freezing point temperature, said compound having a latent heat value in the range from approximately 150 to 350 kilojoules per kilogram;

at least one gas conduit having thermally conductive walls, said conduit immersed in and passing through said thermal reservoir, said gas conduit having an inlet and an outlet, said inlet receiving said flow of gas and said outlet releasing said flow of gas after said withdrawal of said heat energy;

means for producing said flow of gas through said at least one gas conduit;

a thermoelectric device for removing said heat energy acquired from said flow of gas, from said thermal reservoir and maintaining said compound at a temperature approximately equal to said freezing point during said withdrawal of heat energy from said flow of gas, said thermal reservoir positioned between a first and a second element of said thermoelectric device;

means for removing heat energy from said first and second elements of said thermoelectric device;

means for monitoring a temperature of said thermal reservoir;

means for controlling said thermoelectric device in response to said monitored temperature, said control means for maintaining said thermal reservoir at or near said freezing point temperature;

means for monitoring a temperature of said flow of gas; and means for controlling a rate of said withdrawal of heat energy from said flow of gas.

* * * * *